United States Patent
Sauter et al.

(10) Patent No.: US 9,562,459 B2
(45) Date of Patent: Feb. 7, 2017

(54) SCR-MODULE

(71) Applicant: MTU Friedrichshafen GmbH, Friedrichshafen (DE)

(72) Inventors: Benjamin Sauter, Bermatingen (DE); Holger Sinzenich, Markdorf (DE); Katharina Görner, Friedrichshafen (DE); Mathias Bauknecht, Tettnang (DE); Klaus Wehler, Friedrichshafen (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 0 days.

(21) Appl. No.: 14/564,823

(22) Filed: Dec. 9, 2014

(65) Prior Publication Data
US 2015/0089928 A1    Apr. 2, 2015

Related U.S. Application Data

(63) Continuation of application No. PCT/EP2013/002589, filed on Aug. 28, 2013.

(30) Foreign Application Priority Data

Sep. 14, 2012  (DE) ........................ 10 2012 018 141

(51) Int. Cl.
*F01N 3/24* (2006.01)
*F01N 3/20* (2006.01)
*F01N 13/04* (2010.01)

(52) U.S. Cl.
CPC ............. *F01N 3/2066* (2013.01); *F01N 3/208* (2013.01); *F01N 13/04* (2013.01);
(Continued)

(58) Field of Classification Search
CPC . F01N 13/04; F01N 13/011; F01N 2900/1808
See application file for complete search history.

(56) References Cited

U.S. PATENT DOCUMENTS

2013/0125524 A1* 5/2013 Plummer ............ F01N 13/0097 60/39.5
2013/0199160 A1* 8/2013 Kruer ........................ F01N 3/08 60/274

FOREIGN PATENT DOCUMENTS

DE        43 10 962 C1      2/1994
DE  10 2005 025 045 A1    12/2006
(Continued)

OTHER PUBLICATIONS

Machine translation of DE 102011002987 A1, accessed on Jan. 8, 2016.*

(Continued)

*Primary Examiner* — Jonathan Matthias
(74) *Attorney, Agent, or Firm* — Taylor IP, P.C.

(57) ABSTRACT

Reciprocating-piston internal combustion engines having different power outputs are to be equipped simply, reliably and inexpensively with a device for the selective catalytic reduction of the exhaust gases having an SCR module for a reciprocating-piston internal combustion engine, comprising a housing and/or a frame, an exhaust-gas section which delimits a flow duct for guiding through exhaust gas, having an inlet opening for introducing the exhaust gas and an outlet opening for discharging the exhaust gas, an SCR catalytic converter which is arranged inside the flow duct, at least one injection element for adding a reducing agent, for example ammonia or a urea solution, to the exhaust gas which is guided through the flow duct. This problem is solved by virtue of the fact that the SCR module comprises at least one
(Continued)

delivery device (13) for feeding the reducing agent to the injection element at a predetermined pressure.

13 Claims, 3 Drawing Sheets

(52) U.S. Cl.
CPC .. *F01N 2610/02* (2013.01); *F01N 2900/1808* (2013.01); *Y02T 10/24* (2013.01); *Y10T 29/49231* (2015.01)

(56) References Cited

FOREIGN PATENT DOCUMENTS

| DE | 10 2009 009 711 A1 | 8/2010 |
| DE | 10 2010 021 438 A1 | 12/2011 |
| DE | 10 2011 002 987 A1 | 7/2012 |
| DE | 10 2011 050 928 A1 | 12/2012 |

OTHER PUBLICATIONS

International Search Report dated Nov. 11, 2013 for International Application No. PCT/EP2013/002589 (4 pages).

\* cited by examiner

SCR-MODULE

CROSS REFERENCE TO RELATED APPLICATIONS

This is a continuation of PCT application No. PCT/EP2013/002589, entitled "SCR-MODULE", filed Aug. 28, 2013, which is incorporated herein by reference.

BACKGROUND OF THE INVENTION

1. Field of the Invention

The current invention relates to an SCR module for use with an internal combustion engine system, and a method for the production of an internal combustion engine system.

2. Description of the Related Art

Reciprocating piston internal combustion engines are used for various applications. In stationary systems the reciprocating piston internal combustion engines serve for example in combination with a generator to produce electricity. In mobile systems reciprocating piston internal combustion engines are used to power ships, military vehicles, for example tanks, or also to drive agricultural utility vehicles. The reciprocating piston internal combustion engines should hereby exhibit the lowest possible nitrogen oxide emissions. It is known to selectively reduce the nitrogen oxides in the exhaust gases by means of a selective catalytic reaction (SCR) on an SCR catalytic converter. The emission of nitrogen oxides ($NO_2$) can thereby be considerably reduced. This reaction process requires ammonia ($NH_3$) and the products of the reaction are water ($H_2O$) and nitrogen ($N_2$). Titanium dioxide, vanadium pentoxide and tungsten dioxide for example are used as SCR catalytic converters, or also other types of SCR catalytic converters, for example by using zeolites. The ammonia used for the reaction is hereby not added undiluted or in other words in pure form, but rather as a 32.5% aqueous urea solution and is referred to in the automotive industry as Adblue.

Internal combustion engine systems may therefore equipped with devices for selective catalytic reduction of exhaust gases. For reciprocating piston internal combustion engines having varying power outputs, for example an output of between 600 and 4000 kW it is necessary to provide at considerable expense appropriate devices for selective catalytic reduction which can sufficiently extract or reduce the volume flow of nitrogen oxide from the exhaust gas of the reciprocating piston internal combustion engines. For this reason it is necessary to provide appropriately different devices that are complex and expensive for reciprocating piston internal combustion engines having varying outputs. This increases the costs for the production of the internal combustion engine systems considerably and moreover, complex and expensive assembly efforts are required in the production of the internal combustion engine system which are also susceptible to errors.

An exhaust system for several independently operable internal combustion engines is known from German patent document DE 43 10 962 C1. The exhaust gas is directed into a common exhaust gas line, whereby the nitrogen removal from the exhaust gas occurs through selective catalytic reduction by addition of a reducing agent into the exhaust gas stream. The common exhaust gas line branches into at least two branch lines, in which at least one SCR catalytic converter is arranged and at least a section of the branch lines can be shut off using an adjustable shut-off valve, depending on the operating condition.

DE 10 2010 021 438 A1 describes an exhaust gas treatment device, in particular for a diesel engine through which an exhaust stream can flow in an exhaust stream flow direction and including an exhaust gas inlet, a reducing agent adding system for addition of a reducing agent into the exhaust gas stream, a nitrogen oxide reduction catalytic converter and an exhaust gas outlet, wherein the reducing agent adding system includes at least two reducing agent adding devices, in particular injection nozzles.

An exhaust gas system for an internal combustion engine, in particular for a motor vehicle is known from DE 10 2005 025 045 A1. The exhaust gas system includes an SCR-module and a particle filter module. The SCR module is provided with an SCR catalytic converter element and a urea metering device.

SUMMARY OF THE INVENTION

The current invention provide an SCR module, an internal combustion engine system and a method to produce an internal combustion engine system, wherein reciprocating piston internal combustion engines having varying outputs can be equipped simply, reliably and cost effectively with a device for selective catalytic reduction of the exhaust gasses.

An SCR module for a reciprocating piston internal combustion engine includes a housing and/or a frame, an exhaust gas section which delimits a flow duct for carrying the exhaust gas, having an inlet opening for introducing the exhaust gas and an outlet opening for discharging the exhaust gas, an SCR catalytic converter which is arranged inside the flow duct, at least one injection element for adding a reducing agent, for example ammonia or a urea solution to the exhaust gas which is directed through the flow duct, wherein the SCR module includes at least one delivery device for feeding the reducing agent to the injection element at a predetermined pressure.

The injection element requires the reducing agent at a certain predetermined pressure. For this reason the SCR module is provided with at least one delivery device, in particular for each injection element. Thus, for the selective catalytic reaction the SCR module requires the reducing agent only at a non-predetermined pressure. The SCR module can be utilized in a simple manner in an internal combustion engine system, since only an exhaust line and a reducing agent line have to be connected to the SCR module. The SCR module can therefore be especially easily installed during assembly, and separate assembly of a delivery device on the SCR module is therefore no longer necessary.

The at least one delivery device can be in the embodiment of a pump, preferably a piston pump or flow generator, for example a centrifugal pump and/or the predetermined pressure is in the range of 8 to 12 bar and/or the at least one delivery device is integrated and/or installed into the SCR module, in other words it is an integral part of the SCR module and is connected with the remaining SCR module, for example a frame and/or a housing through a solid connection, for example a welded or riveted joint or through a detachable connection, for example a screw connection or clip joint.

In an additional arrangement the SCR module includes a reducing agent line. The SCR module includes in particular at least one reducing agent supply line to direct the liquid or gaseous reducing agent from the delivery device to the at least one injection element; and the SCR module includes at least one reducing agent return line to discharge the excess reducing agent from the at least one injection element. In general the reducing agent is fed through a circulation system to the injection element, so that a reducing agent supply line and a reducing agent return line is required, in particular for each injection element.

In an additional embodiment the SCR module includes at least one pressure sensor to sense the pressure of the reducing agent which is fed to the at least one injection element. The pressure sensor senses the pressure of the reducing agent being fed to the injection element, for example at the reducing agent supply line or at the injection element. Depending on the pressure of the reducing agent sensed by the pressure sensor, the delivery performance of the at least one delivery device is controllable and/or adjustable through a control or regulating unit.

The SCR module preferably includes a hydraulic interface for supplying the SCR module with the reducing agent and/or the SCR module includes an electric interface for electric connection of the SCR module, for example for supply of electricity and/or data exchange. The hydraulic interface features devices for leak-proof supply of the reducing agent into the SCR module. This may for example be an SAE J2044. The electric interface is for example in the embodiment of a Harting connector.

The SCR module expediently features an exhaust gas interface, for example an exhaust gas pipe socket or an interface in the form of, for example an ASME-exhaust flange.

An internal combustion engine system according to the invention includes a reciprocating piston internal combustion engine, e.g., only one reciprocating piston internal combustion engine, an SCR module for treatment of exhaust gas, an exhaust gas line to bring the exhaust gas from the reciprocating piston internal combustion engine to the SCR module, whereby the internal combustion engine system includes multiple SCR modules and the SCR modules, such as all SCR modules, are connected in parallel relative to the exhaust gas.

The internal combustion engine system includes multiple SCR modules which are connected parallel relative to the exhaust gas. In the use of reciprocating piston internal combustion engines having different outputs, for example in the range of 600 and 4000 kW utilization of an appropriate number of SCR modules can selectively catalytically reduce the volume flow of the exhaust gas of the reciprocating piston internal combustion engine. The SCR modules and the exhaust gas line as an exhaust gas system can therefore only be adapted in an especially simple manner to varying outputs or respectively exhaust volume flows of reciprocating piston internal combustion engines in that a different number of SCR modules is utilized for selective catalytic reduction in the exhaust gas system.

In one variation the SCR modules of the internal combustion engine system are designed as SCR modules and/or the exhaust gas line features branching for parallel guidance of the exhaust gas from the reciprocating piston internal combustion engine into the SCR modules.

The SCR modules are expediently designed identically and/or the reciprocating piston internal combustion engine is a diesel engine. The SCR modules can be arranged identically or basically identically. In order to be able to provide an appropriate exhaust gas system for reciprocating piston internal combustion engines having different outputs only one type of SCR module needs to be advantageously produced and utilized. The costs for the production of the SCR modules is thereby considerably simplified and reduced, since only one type of SCR module is utilized for internal combustion engines within a certain output range. Moreover, a simpler connection and assembly of the SCR modules with each other during assembly of the internal combustion engine system becomes possible, since only identical SCR modules are used.

In an additional embodiment the SCR modules include identical exhaust gas systems and/or identical SCR catalytic converters and/or identical exhaust gas interfaces for feeding and discharging the exhaust gas and/or identical hydraulic interfaces and/or identical electric interfaces.

The internal combustion engine system includes in particular a reducing agent interface, in particular only one reducing agent interface, for hydraulic connection with a reducing agent tank and/or the internal combustion engine system includes one particle filter for the exhaust gas and/or there is no shut-off device, for example a shut-off valve or stopcock arranged in the exhaust gas line, in particular for individual SCR modules. The reducing agent tank is not an integral part of the internal combustion engine system and with the reducing agent interface the entire internal combustion engine system can be supplied with the reducing agent, that is, the SCR modules. There is no shut-off valve installed into the exhaust gas line of the SCR modules so that exhaust gas from the reciprocating piston internal combustion engine can flow, or is flowing constantly, through all SCR modules. To that effect the number of SCR modules is designed so that they can selectively catalytically sufficiently reduce the volume flow of exhaust gas of the reciprocating piston internal combustion engine.

In an additional arrangement the reducing agent interface is connected hydraulically with the SCR modules, in particular all SCR modules, by way of a reducing agent main supply line and a reducing agent main return line. The reducing agent supply line and the reducing agent main return line are in particular connected hydraulically with the hydraulic interfaces at the SCR modules. All SCR modules can be connected hydraulically by way of the reducing agent main supply line and return line with the reducing agent interface and thereby also with the reducing agent tank, so that thereby especially simple hydraulic connection between the reducing agent tank and the SCR modules is possible for the supply with reducing agent.

In an additional alternative variation the internal combustion engine system includes a control and/or regulating unit, in particular only one control and/or regulating unit, for the SCR modules and preferably for the reciprocating piston internal combustion engine.

In an additional alternative variation the control and regulating unit is connected electrically with the SCR modules, in particular with all SCR modules by way of at least one control and/or main power line and the at least one control and/or main power line is connected electrically with the electric interfaces of the SCR module. In addition to the SCR modules the reciprocating piston internal combustion engine is also controlled and/or regulated with the control and regulating unit. The control and/or regulating unit controls and/or regulates in particular the injection element so that depending on the exhaust gas volume stream flowing through the SCR modules a sufficient volume flow of reducing agent is fed to the exhaust gas flowing through the SCR modules.

A method according to the invention for the production of an internal combustion engine system, in particular an internal combustion engine system, includes the following steps: provision of at least one reciprocating piston internal combustion engine, in particular only one reciprocating piston internal combustion engine; provision of an SCR module; provision of an exhaust line; connecting the exhaust line with the reciprocating piston internal combustion engine and the SCR module, whereby several SCR modules are provided and are connected parallel relative to the exhaust gas by way of the exhaust gas line with the reciprocating piston internal combustion engine.

In an additional arrangement the SCR modules are provided in the following terms: that the SCR modules are designed consistent with the SCR modules described in this patent application and/or that identical SCR modules are provided and/or the SCR modules are provided with identical exhaust gas systems and/or identical SCR catalytic converters and/or identical exhaust gas interfaces for feeding and discharging the exhaust gas and/or identical hydraulic interfaces and/or identical electric interfaces; and/or the greater the output of the reciprocating piston internal combustion engine or the output of the sum of the reciprocating piston internal combustion engines, the higher the number of SCR modules which will be provided and vice versa and are connected parallel relative to the exhaust gas with the reciprocating piston internal combustion engine.

The reciprocating piston internal combustion engine and/or the SCR module and/or the exhaust gas line may be supplied and/or produced by only one company. The internal combustion engine system is thereby supplied and/or produced by only one company so that for example the delivery and assembly of the internal combustion engine system is performed by the only one company.

In an additional embodiment the reducing agent line, the reducing agent main supply line and preferably the reducing agent interface, and preferably the hydraulic interface, and preferably the hydraulic mating interface feature an electric heating device, so that a frozen reducing agent can be thawed with the electric heating device.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrate one embodiment of the invention, and such exemplification is not to be construed as limiting the scope of the invention in any manner.

DETAILED DESCRIPTION OF THE INVENTION

Figure 3:
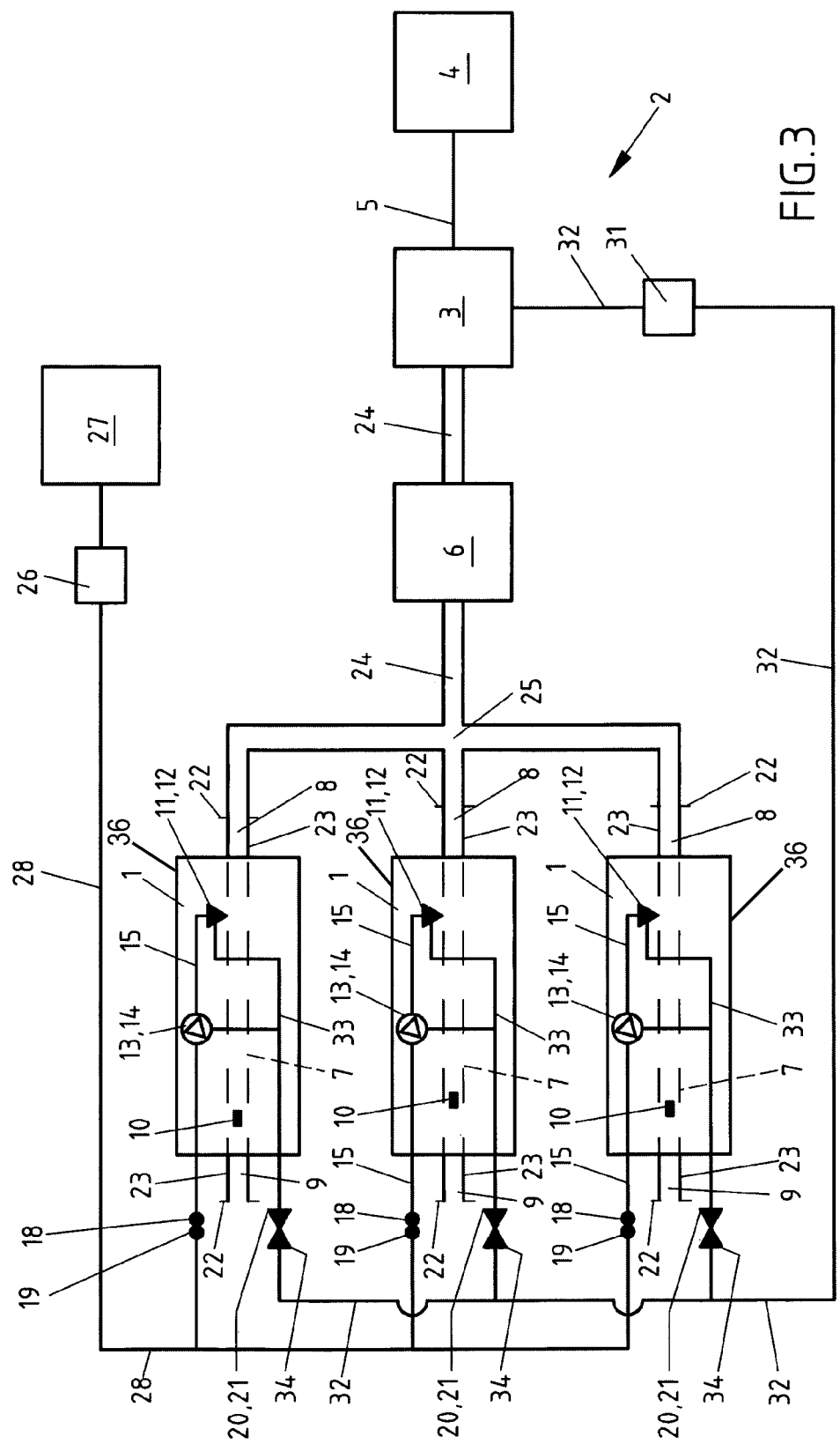
FIG. 3 is a schematic drawing of an internal combustion engine system with the SCR modules according to FIGS. 1 and 2.

In addition to a reciprocating piston internal combustion engine 3 in the embodiment of a diesel motor the internal, combustion engine system 2 illustrated in FIG. 3 includes also a generator 4 which is driven by way of a drive shaft 5 by reciprocating piston internal combustion engine 3. Internal combustion engine system 2 is thus a stationary system and serves to generate electricity. Deviating therefrom the internal combustion engine system 2 can also be installed in a mobile system without generator 4, for example to power a ship, a military vehicle, for example a tank, or also to drive an agricultural utility vehicle.

Internal combustion engine system 2 moreover includes a particle filter 6 and three SCR modules 1. Each SCR module 1 includes a housing 36 and a frame. The exhaust gas flowing from reciprocating piston internal combustion engine 3 is initially directed through an exhaust gas line 24 through particle filter 6 where particles are discharged, and subsequently directed from particle filter 6 to the three SCR modules 1. Exhaust gas line 24 is equipped with branching 25 and there is no shut-off device, for example a shut-off valve located in exhaust line 24, so that during operation of the internal combustion engine system 2 exhaust gas from the reciprocating piston internal combustion engine 3 constantly flows or can flow through the three SCR modules 1.

SCR modules 1 are designed identically. Each of the SCR modules 1 includes two injection elements 11 and one exhaust gas section 7 for directing the exhaust gas through the SCR module 1. Exhaust gas section 7 is connected to the housing 36 and/or to the frame of the SCR module 1, and includes an inlet opening 8 for introducing the exhaust gas and an outlet opening 9 for discharging the exhaust gas (FIG. 3). In this case inlet and outlet opening 8, 9 are in the embodiment of an exhaust gas pipe socket 23 for connection to exhaust gas line 24. Exhaust gas interfaces 22 are designed identically, for example as ASME exhaust gas flanges. One exhaust gas line 24 with corresponding connection interfaces is therefore required for the three SCR modules 1 for connection to exhaust gas interfaces 22. These connection interfaces on exhaust gas lines 24 are hereby advantageously and simply designed identically since identical exhaust gas interfaces 22 are disposed on SCR modules 1.

Figure 1:
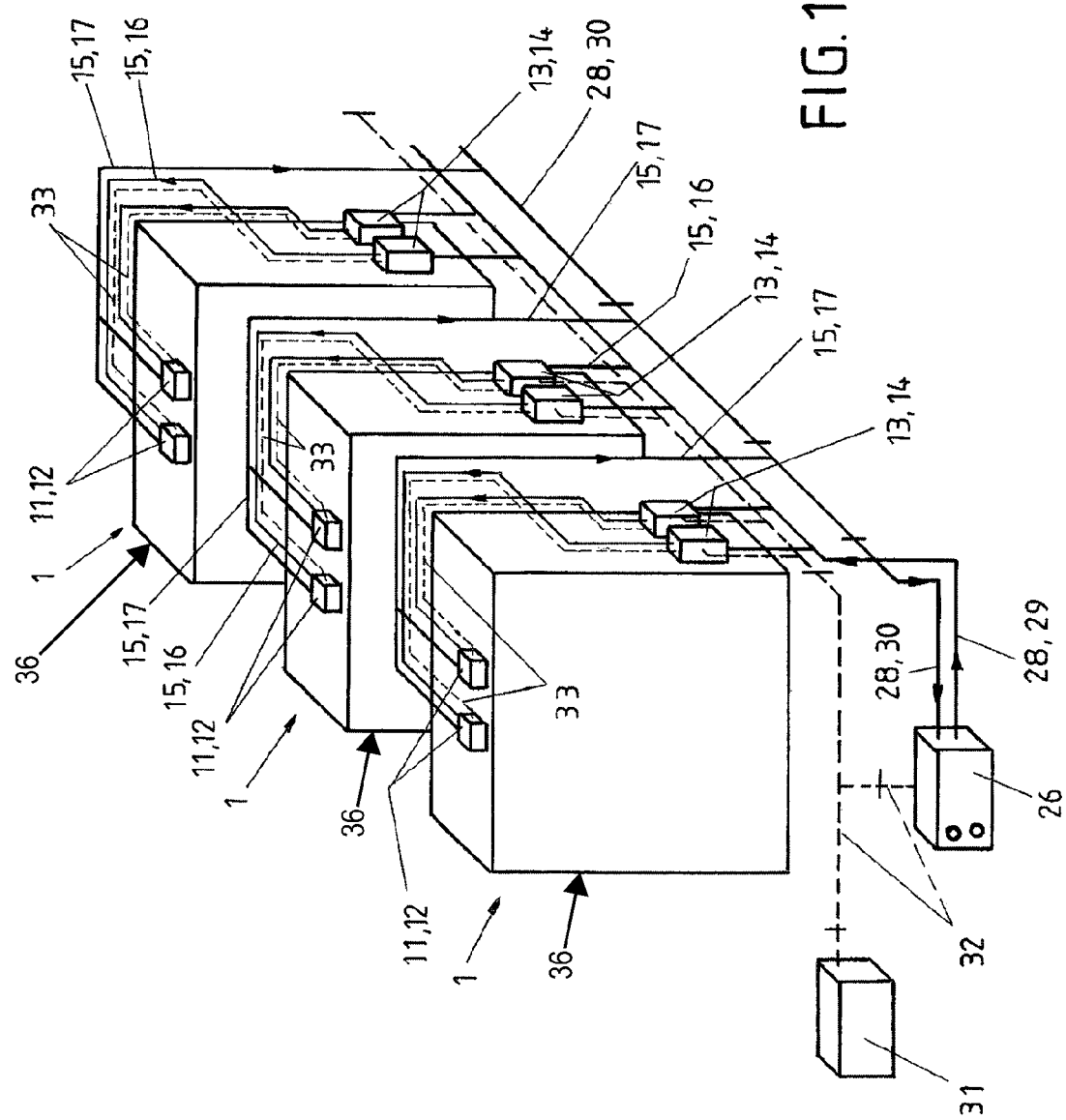
FIG. 1 is an exploded view of several SCR modules.
Figure 2:
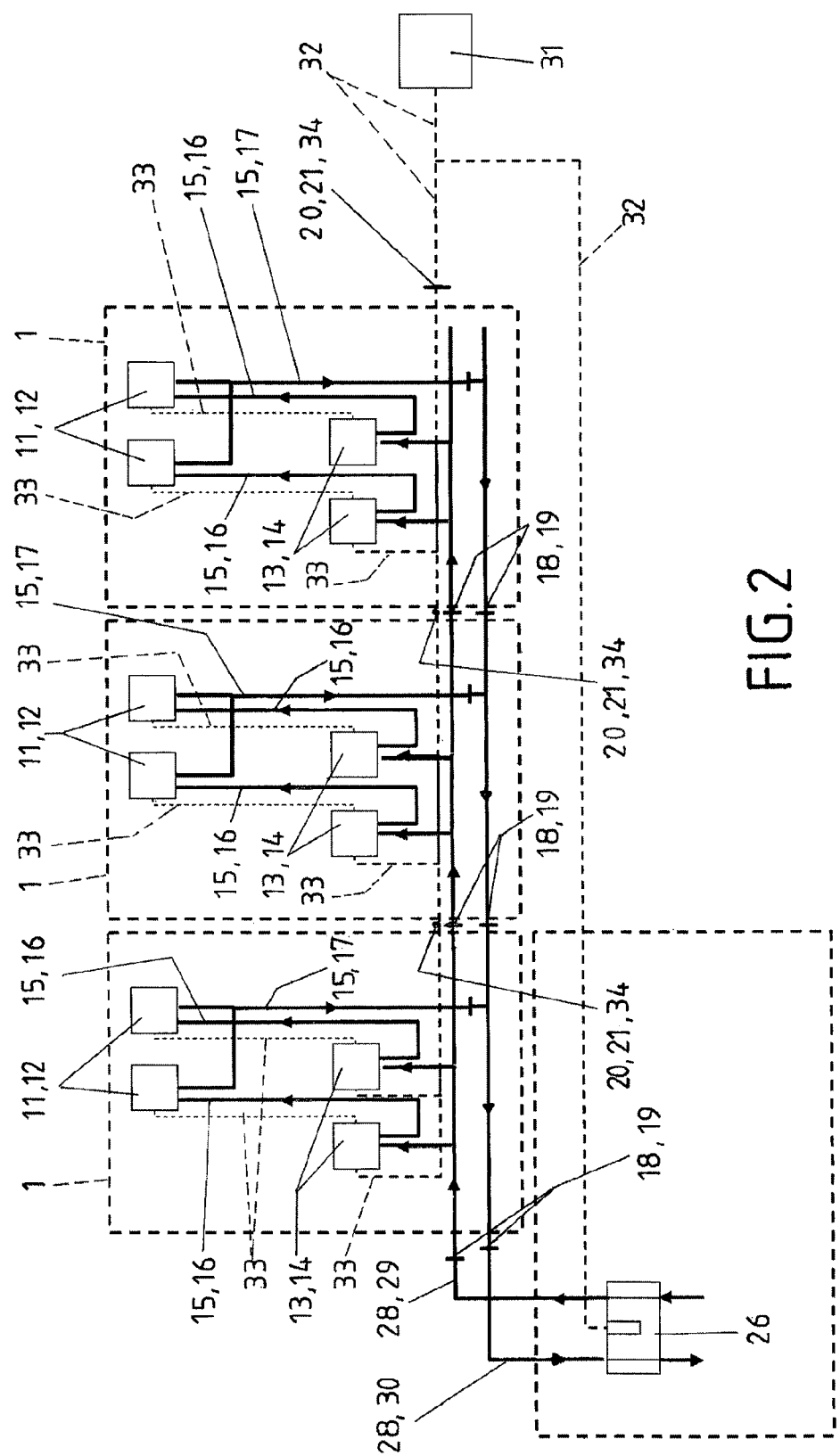
FIG. 2 is a hydraulic and electric schematic of the SCR modules shown in FIG. 1.

One delivery device 13 in the embodiment of a pump 14 is always allocated to each of the two injection nozzles 12 in an SCR module 1, so that each of SCR modules 1 features two delivery devices 13 (FIGS. 1 and 2). The delivery devices 13 are integrated or installed into the housing or frame of each SCR module 1. For simplification reasons only one of the two pumps 14 and injection nozzles 11 is illustrated in FIG. 3. The reducing agent that is a 32.5% urea solution with ammonia is provided by means of pumps 14 under a constant pressure in the range of 10 bar to injection nozzles 12. The reducing agent is fed to injection nozzles 12 in a cycle so that the reducing agent is supplied to injection nozzles 12 through a reducing agent supply line 16 in the embodiment of reducing agent line 15 on SCR modules 1, and the portion of reducing agent which is not required or not injected is returned or respectively removed from injection nozzle 12 and also from SCR module 1 through a reducing agent return line 17 in the embodiment of a reducing agent line 15 (FIGS. 1 and 2). The reducing agent serves at the same time as a coolant for injection elements 11, so that no compressed air is necessary for cooling of injection module 11. For simplification reasons reducing agent supply and return lines 16, 17 are illustrated in FIG. 3 in a simplified version only as one reducing agent line 15. Each SCR module 1 has one hydraulic interface 18 by way of which the reducing agent can be fed to pumps 14 from a reducing agent main line 28 which is in the embodiment of a reducing agent main supply line 29 and a reducing agent main return line 30 (FIGS. 1 and 2). Reducing agent main lines 28 feature a hydraulic mating interface 19, and hydraulic interface 18 on SCR module 1 is connected conductively hydraulically with hydraulic mating interface 19 on reducing agent main line 28. These could be separate hydraulic interfaces 18, for reducing agent supply and return line 16, 17 respectively; or with only one hydraulic interface per SCR module the reducing agent supply and return lines 16, 17 can be connected conductively with reducing agent main supply line 29 and reducing agent main return line 30 hydraulically separated. Reducing agent main line 28 is connected hydraulically conductively with a reducing agent interface 26 with a reducing agent tank 27. Internal combustion engine system 2 features hereby only one reducing agent interface 26 by way of which all SCR modules 1 can be supplied with the reducing agent. For this purpose, reducing agent main line 28 features appropriate branching to the three hydraulic interfaces 18 on the three SCR modules 1.

Internal combustion engine system 2 features a control and/or regulating unit 31. Control and/or regulating unit 31 serves to control and/or regulate reciprocating piston internal combustion engine 3, for example the output and/or speed and/or λ-value of reciprocating piston internal combustion engine 3. Moreover, control and/or regulating unit 31 also controls and/or regulates SCR module 1, in particular the capacity of pumps 14 and the injection times and/or the injection volume flow of reducing agent with injection nozzles 12. For this purpose, control and/or regulating unit 31 is connected with electric interfaces 20 on SCR modules 1 via a control- and/or main power line 32 which branches appropriately. An electric mating interface 34 is arranged on control- and/or main power lines 32 following each branching. Electric mating interfaces 34 at the branched control and/or main power lines 32 are hereby connected with electric interfaces 20 on SCR modules 1. Electric interfaces 20 are thus an integral part of SCR module 1, as are hydraulic interfaces 18. Electric interfaces 20 are for example in the embodiment of an electric plug 21 and electric mating interface 34 are in the embodiment of an electric mating plug. Control and/or power lines 33 lead from electric interfaces 20 on SCR modules 1 to delivery devices 13 and injection elements 11 (FIGS. 1 to 3).

Inside a flow duct which is limited by exhaust system 7 an SCR catalytic converter 10 is arranged, consisting for example of titanium dioxide, vanadium pentoxide and tungsten dioxide. While the exhaust gas is flowing through exhaust gas system 7, a reducing agent is introduced into the exhaust gas stream by means of injection elements 11, so that the nitrogen oxides (NO, $NO_2$) contained in the exhaust gas can thereby be fundamentally reduced at SCR catalytic converter 10, so that resulting from this reaction water and nitrogen flow from outlet opening 9 at SCR module 1.

Considered overall, considerable advantages are attributed to inventive SCR module 1 and to internal combustion engine system 2. Only identical SCR modules 1 are utilized on internal combustion engine system 2. To adapt to different outputs and thereby volume flows of exhaust gas of reciprocating piston internal combustion engine 3, only the number of SCR modules 1 needs to be varied or changed, for example between one and five SCR modules 1. The required device for selective catalytic reduction, in other words SCR module 1, can be adapted to the output of reciprocating piston internal combustion engine 3, for example with an output between 600 and 4000 kW, only by arrangement of an appropriate number of SCR modules.

SCR modules 1 feature identical exhaust gas interfaces 22, identical hydraulic interfaces 18 and identical electric interfaces 20, so that during connection and assembly of SCR modules 1 these can be connected especially easily with exhaust line 24, reducing agent main line 28 and control and/or main power line 32. The aforementioned interfaces are moreover designed according to the so-called Poka-Yoke system, so that an erroneous connection of SCR modules 1 can essentially be avoided. Because of the identical design of SCR modules 1 the production costs of SCR modules 1 can be substantially reduced, since for reciprocating piston internal combustion engines 3 within a certain output range only one type of SCR modules 1 needs now to be produced. The expenditure during assembly and start-up is thereby considerably reduced, so that during production and assembly of internal combustion engine system 2 also so-called "delegated assembly" is possible.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An exhaust aftertreatment system for a reciprocating internal combustion engine, comprising:
    a plurality of SCR modules;
    a housing for each SCR module;
    a flow duct for guidance of exhaust gas connected to the housing of each SCR module, the flow ducts having a standardized inlet interface for receiving the exhaust gas and an outlet opening for discharging the exhaust gas;
    an SCR catalytic converter which is arranged inside the flow duct of each SCR module;
    at least one injection element connected to the flow duct of each SCR module for adding a reducing agent to the exhaust gas which is guided through the flow duct;
    at least one delivery device integrated or installed into the housing of each SCR module to supply the reducing agent to the at least one injection element at a predetermined pressure;
    a standardized hydraulic interface for each SCR module for supplying the at least one delivery device with the reducing agent; and
    a standardized electric interface for electric connection of each SCR module for at least one of supply of electricity to said at least one injection element and to said at least one delivery device of each SCR module, and data exchange with said at least one injection element and with said at least one delivery device of each SCR module.

2. The exhaust aftertreatment system according to claim 1, wherein:
    the at least one delivery device is configured as one of a piston pump, a centrifugal pump, and a flow generator.

3. The exhaust aftertreatment system according to claim 1, wherein the predetermined pressure is between about 8 and about 12 bar.

4. The exhaust aftertreatment system according to claim 1, wherein the standardized hydraulic interfaces of said plurality of SCR modules includes at least one reducing agent supply connection to provide the reducing agent from a reducing agent interface to the delivery device integrated or installed into said housing of each SCR module; and at least one reducing agent return connection to discharge the excess reducing agent from the at least one injection element.

5. The exhaust aftertreatment system according to claim 1, wherein each of the SCR modules includes at least one pressure sensor within the SCR module to sense the pressure of the reducing agent which is fed to the at least one injection element from said delivery device integrated or installed into the housing of each SCR module.

6. The exhaust aftertreatment system according to claim 1, further comprising:
a particulate filter arranged inside the flow duct of each SCR module.

7. The exhaust aftertreatment system according to claim 1, wherein:
no shut-off is device arranged inside the flow duct of each SCR module.

8. The exhaust aftertreatment system according to claim 1, wherein:
each said standardized hydraulic interface supplying each at least one delivery device with the reducing agent at a non-predetermined pressure.

9. The exhaust aftertreatment system according to claim 1, wherein:
said reducing agent is one of a liquid and a gas.

10. The exhaust aftertreatment system according to claim 1, wherein:
each said delivery device integrated or installed into said housing of each SCR module being at least one of controllable and adjustable by a control or regulating unit, said control or regulating unit being connected to the delivery device of each SCR module and to the standardized electric interface of each SCR module.

11. The exhaust aftertreatment system according to claim 1, wherein:
said standardized hydraulic interfaces further comprise SAE J2044 connectors.

12. The exhaust aftertreatment system according to claim 1, wherein:
said standardized electric interfaces further comprise Harting connectors.

13. The exhaust aftertreatment system according to claim 1, wherein:
said standardized inlet interfaces further comprise one of an exhaust gas pipe socket and an ASME-exhaust flange.

* * * * *